United States Patent
Gruber et al.

(10) Patent No.: US 6,537,654 B1
(45) Date of Patent: Mar. 25, 2003

(54) PROTECTION PRODUCTS AND ARMORED PRODUCTS MADE OF FIBER-REINFORCED COMPOSITE MATERIAL WITH CERAMIC MATRIX

(75) Inventors: Udo Gruber, Neusäss (DE); Michael Heine, Allmannshofen (DE); Andreas Kienzle, Thierhaupten (DE); Reinhard Nixdorf, Thierhaupten (DE)

(73) Assignee: SGL Technik GmbH, Meitingen (DE)

( * ) Notice: Subject to any disclaimer, the term of this patent is extended or adjusted under 35 U.S.C. 154(b) by 0 days.

(21) Appl. No.: 09/547,684

(22) Filed: Apr. 12, 2000

(30) Foreign Application Priority Data

Dec. 8, 1999 (DE) ..................... 299 21 452 U
Nov. 4, 1999 (DE) ..................... 199 53 259

(51) Int. Cl.$^7$ .............................. B32B 18/00
(52) U.S. Cl. .................. 428/293.4; 428/49; 428/367; 428/408; 89/36.02; 109/49.5
(58) Field of Search ................. 428/293.4, 49, 428/304.4, 284, 408, 272, 367; 89/36.02; 109/80, 49.5

(56) References Cited

U.S. PATENT DOCUMENTS

| | | | |
|---|---|---|---|
| 5,114,772 A | | 5/1992 | Vives et al. |
| 5,236,638 A | * | 8/1993 | Schulten et al. |
| 5,635,300 A | | 6/1997 | Kostikov et al. |
| 5,853,429 A | | 12/1998 | Heine et al. |
| 6,030,913 A | * | 2/2000 | Heine et al. |
| 6,231,791 B1 | | 5/2000 | Heine et al. |

FOREIGN PATENT DOCUMENTS

| | | |
|---|---|---|
| DE | 41 27 693 A1 | 2/1993 |
| DE | 195 17 911 A1 | 11/1996 |
| DE | 197 10 105 A1 | 9/1998 |
| DE | 197 11 829 C1 | 9/1998 |
| DE | 198 31 725 C1 | 7/1999 |
| EP | 0 994 084 A1 | 4/2000 |
| EP | 1 008 569 A1 | 6/2000 |

OTHER PUBLICATIONS

Hubert Orsini et al.: "Specific Test to Evaluate Intrinsic Ballistic Prperties of Ceramic Materials Against an AP 12.7 MM Projectile. Application to Improve Ceramic Materials", 15$^{th}$ International Symposium on Ballistics, Jerusalem, Israel, May 21–24, 1995.
International Publication WO 98/42635 (Dietrich et al.), dated Oct. 1, 1998.
International Publication WO 98/51988 (Strasser et al.), dated Nov. 19, 1998.

* cited by examiner

Primary Examiner—Merrick Dixon
(74) Attorney, Agent, or Firm—Laurence A. Greenberg; Werner H. Stemer; Gregory L. Mayback

(57) ABSTRACT

Protection products and armored products made of a fiber-reinforced composite material with a ceramic matrix, include a protection element for partial or complete absorption of at least one impact-like load focussed at a point. The protection element has a body having at least one dimension at least equal to 3 cm, in a direction perpendicular to a load to be absorbed. The body includes a fiber-reinforced composite material having a ceramic matrix with at least 10% by weight of silicon carbide and having reinforcing fibers. At least 5% by weight of the reinforcing fibers are carbon fibers and/or graphite fibers.

17 Claims, No Drawings

PROTECTION PRODUCTS AND ARMORED PRODUCTS MADE OF FIBER-REINFORCED COMPOSITE MATERIAL WITH CERAMIC MATRIX

BACKGROUND OF THE INVENTION

FIELD OF THE INVENTION

The invention relates to protection elements made of a fiber-reinforced or fiber-bundle-reinforced composite material with a ceramic matrix for partial or complete absorption of at least one impact-like load focussed at a point, as well as structural components and armored products made of the composite material.

In the following description and in the claims, both individual fibers and fiber bundles that are used for the most part and can have a substantially greater width as well as height, as compared with individual fibers, are referred to together under the term "fibers".

Fiber-reinforced composite materials with a ceramic matrix have been known for a long time and in general are distinguished by high strength and rigidity with simultaneously low weight. Those properties are maintained even up to high temperatures. The fiber-reinforced composite materials have a high thermal conductivity and at the same time a low thermal expansion and thus an excellent resistance to thermal shocks.

Starting from carbon-fiber-reinforced composite materials with a carbon matrix (CFC), composite materials with SiC as a matrix have been developed to an increasing extent over the last ten years, with carbon fibers (C/SiC) and silicon carbide fibers (SiC/SiC) being used as reinforcing fibers.

A silicon carbide body which is reinforced with short graphite fibers and which has a quasi-ductile breaking behavior, is known from German Published, Non-Prosecuted Patent Application DE 197 10 105 A1. The reinforcing short graphite fibers are surrounded by at least one shell of graphitized carbon obtained by impregnation with impregnating agents, which can be carbonized, and subsequent carbonization. The shell of the fibers is partly converted into silicon carbide during the production of the C/SiC composite material. To that end, the composite body is infiltrated with liquid silicon, wherein the at least partial conversion of the carbon matrix of the carbonized initial product into silicon carbide also takes place.

In the discussion of that prior art, lining materials for reusable space missiles, nozzle linings of jet engines, turbine blades or even friction linings are generally spoken of as possibilities of use for composite materials. The composite materials described in German Published, Non-Prosecuted Patent Application DE 197 10 105 A1 can be used as portions of gas turbines, as components of burners and nozzles, as hot-gas pipes, or even as friction materials for high loads, such as linings for brakes.

A process for producing fiber-reinforced composite ceramics with high temperature fibers which are reaction-bonded with a matrix based on silicon and silicon carbide or a silicon alloy, as described in German Published, Non-Prosecuted Patent Application DE 41 27 693 A1, for example, is known from German Patent DE 197 11 829 C1. Composite bodies of that type are used for the production of mass-produced components, such as brake discs.

The use of ceramics as an armor plating system, because of their light weights, is also known. Ceramics are generally distinguished by high rigidity and hardness. In the case of their use for armor plating, it is essential that the ceramics be able to withstand a plastic deformation under high load. A high tensile strength is required particularly on a rear surface of an armor plate. For that reason, a typical armor plating in which a composite comprising ceramic is used is therefore formed of a ceramic front side which is provided with a fibrous composite or metal substrate as a reinforcement (backing) on its rear side. Usually, those different materials are connected to each other by gluing. Glass, glass-ceramics, or technical ceramics such as oxides, borides or even carbides are used as the ceramic material. In particular, aluminum oxide has distinguished itself because it is also relatively favorable in terms of cost. However, the ability to withstand a plastic deformation is not particularly satisfactory in ceramics. Since ceramics display a brittle breaking behavior, a loading of the ceramic material focussed on a point, for example by a projectile, leads to a continuous cracking in the ceramic material. The ceramic material is therefore destroyed over a large area and thus loses its protective effect. Heretofore, that problem could be remedied only by mounting small ceramic segments having a maximum extent of 3 cm for a very high protection (protected cars) and 10 cm for a simple, for example military, protection, on a backing in a plane perpendicular to an action of the point-focal load. Thus, if a projectile was impacted, always only one ceramic segment would ever be destroyed. However, the production of a composite made up of such ceramic segments is very costly. Thus, ceramics alone have not heretofore been able to be used as a large-surface protective element.

When an armor plate is hit by a projectile, in the case of a conventional ceramic material, a breakage of the ceramic plate itself results because of a reflection of stress waves within the ceramic plate. It is only because a further rear side, for example made of metal, is mounted behind the ceramic plate, that it is possible to prevent the projectile from completely penetrating that armor plate.

In the case of the use of ceramic material for armor plates, it is necessary for the ceramic material to have a hardness which is clearly greater than the material of the projectile, which usually has a Vicker's hardness of approximately 6.5 to 8.0 $kN/mm^2$. It would therefore be favorable to use materials having a hardness of more than approximately 9.8 $kN/mm^2$. If the ceramic material is too soft, the projectile core penetrates through the ceramic material, because it is not damaged or flattened by the ceramic material.

However, there is also ammunition with a clearly greater hardness, particularly if ammunition having a core of tungsten carbide in a nickel-iron matrix is used. In such a case, the hardness can rise to approximately 11 $kN/mm^2$, for example.

A ceramic material made of highly pure aluminum oxide could withstand such a projectile because it has a hardness of more than approximately 16.6 $kN/mm^2$. It is likewise possible to use other ceramic materials, for example silicon carbide, as already mentioned above, boron carbide, or even titanium diboride, the hardness of which is clearly greater.

It is likewise known to use zirconia-reinforced aluminum oxide, or titanium borides. However, a hot-press process has to be used during production in order to obtain the optimal properties. In order to do that, the powders from the respective starting material are compacted and heated in a graphite nozzle under an inert gas atmosphere. Due to the complicated production process, the costs of a single armor plate are consequently high.

In view of the price/output ratio, aluminum oxide has heretofore been considered the ceramic material of choice.

In the meantime, first attempts were made to use fiber-reinforced composite materials with a ceramic matrix instead of the conventional ceramics for protection against projectiles. For that purpose, trials were carried out with SiC/SiC composite materials. They displayed limited damage to the material by the impacting projectile, so that the material provides protection against multiple bombardment from an automatic weapon (multiple hits). However, the protective effect against projectiles is very low in comparison with the known ceramics. (see an article by Orsini and Cottenot in the 15th International Symposium on Ballistics, Jerusalem, 1995).

SUMMARY OF THE INVENTION

It is accordingly an object of the invention to provide protection products and armored products made of a fiber-reinforced composite material with a ceramic matrix, which overcome the hereinafore-mentioned disadvantages of the heretofore-known materials and products of this general type and in which the ceramic material has a low specific weight and a good resistance to bombardment and thereby withstands even a repeated bombardment. Furthermore, the material which is sought should to be able to be shaped as a large-surface element through the use of simple shaping processes. In addition, it is a further object of the invention to select the material in such a way that it satisfies even high safety demands with respect to bombardment and other impact-like loads. In this connection, the material which is sought should either be the protective element alone or have a conventional rear-side reinforcement.

With the foregoing and other objects in view there is provided, in accordance with the invention, a protection element for partial or complete absorption of at least one impact-like load focussed at a point, comprising a body having at least one dimension equal to or larger than 3 cm, preferably 10 cm and particularly preferably 30 cm, in a direction perpendicular to a load to be absorbed; the body including a fiber-reinforced composite material, the composite material having a ceramic matrix with at least 10% by weight of silicon carbide, and the composite material having reinforcing fibers; and at least 5% by weight of the reinforcing fibers being carbon fibers or graphite fibers or carbon fibers and graphite fibers.

In order to meet the high safety demands with respect to bombardment and other impact-like loads, elements made of a carbon-fiber and/or graphite-fiber-reinforced composite material with a ceramic matrix are preferably used. The elements are formed of 40 to 85% by weight silicon carbide, 5 to 55% by weight carbon and 0 to 30% by weight silicon with respect to the total weight of the composite material. The fiber portion of the composite material is 5 to 40% by weight of the total weight. In this connection, the average fiber length of the reinforcing fibers is 0.2 to 15 mm and the fibers are coated with at least one layer of carbon. In this connection, the minimum thickness of the elements in the direction of the action of force is to meet the safety demands in an appropriate way, as described in detail in the following. In order to save on material and thus on costs, the thickness of the elements is to be chosen to be as small as possible.

The thickness of the elements made of the fiber-reinforced composite material that are used can be reduced in particular in composites according to the invention in which the elements have a rear reinforcement (also referred to as a backing), that is generally stuck on.

In particular, the elements and composites in accordance with the invention are used as structural components. In this case they are used for armor plating, among other things, in the construction of vehicles of both civil and military types including tanks, in automobile construction, in the construction of aircraft, for example of helicopters and airplanes, in shipbuilding and in the construction of railway vehicles. The armor plating of stationary objects such as buildings and safes, for example, is also possible with the elements and composites in accordance with the invention, for example as a structural component. Furthermore, the elements and composites in accordance with the invention can also be used in protective vests.

Even projectiles making impact during travel through space can, with appropriate construction of the elements and composites in accordance with the invention, be absorbed by the latter so that a use for the protection of spacecraft is also possible.

As a result of the use of the above-described elements and composites, it is possible, in particular, for a loading, for example by shell splinters, by bombardment, for example by projectiles of any kind, to be absorbed without the composite body cracking and exploding into a plurality of pieces. This behavior is completely surprising and could not have been expected, in particular because it was well known heretofore that non-fiber-reinforced ceramic materials have a relatively brittle behavior and thus, in the case of bombardment, a plate made of this ceramic material breaks up into a plurality of pieces. If the elements and the elements which have been reinforced on the rear side have a comparatively small thickness, a shot can pass through, although without a shattering or splintering occurring at the same time, that is unwanted in conventional ceramic materials.

Since the elements and composites in accordance with the invention do not shatter in the case of a point-focal load, they also offer protection against multiple bombardment, in contrast to the known ceramic-based armor platings. The elements in accordance with the invention that are made of reinforced composite materials with a ceramic matrix can therefore be used as armor plating even with larger dimensions than the ceramics used until now. In contrast to the latter, the one-part elements and composites in accordance with the invention can have dimensions greater than 3 cm, preferably greater than 10 cm and particularly preferably greater than 30 cm. Even larger dimensions are possible for the elements so that, for example, portions of motor vehicles can be replaced by them as armor-plating protection.

Furthermore, the elements and composites in accordance with the invention also display a very good behavior when bombarded with automatic weapons (multi-hit properties), because the material is only weakened directly in the area of bombardment.

The fiber-reinforced composite material with a ceramic matrix of the elements in accordance with the invention is suitable for the substantial absorption of any impact-like load focussed at a point and can therefore be used in the widest variety of ways in protection technology. In particular, the use of the elements and composites in the form of armor plates, for example for automobiles, is of technical interest. Thus, for example, it is possible to produce body portions or body reinforcements for airplanes, missiles, trains or even cars from this composite material and thus to obtain vehicles which are completely secure against bombardment without their weight increasing too much.

It is likewise possible, as a result of the use of the fiber-reinforced composite material, to line the floor region of a helicopter cockpit, for example.

A similar protection against bombardment can also be given to ships, which can be manufactured at least partially from this material.

It is likewise possible to use the fiber-reinforced composite material for the protection of buildings, bunkers and storage rooms, for example fuel depots or personnel shelters (tented camps), as well as telecommunications systems or radar stations, without expensive or very heavy materials having to be used for this purpose.

In accordance with the invention, it is, of course, also possible to use the fiber-reinforced composite material as splinter or fragment protection, in particular as protection against grenade splinters or grenade fragments. In this case, the thickness of a protective plate made of this composite material can even be made thinner than in the case of the protection against projectiles.

The use of the fiber-reinforced composite material with a ceramic matrix also includes protection in the civil field, for example in the form of linings for protective vests or generally for clothing worn on the human body.

Furthermore, it is possible to obtain a protection for components of space stations, for example against meteorite impacts, as a result of the use described in accordance with the invention.

The fiber-reinforced composite materials used in accordance with the invention are distinguished in particular as a result of the fact that the solid-body structure is retained for a very long time during energy impact. The incident energy is then transformed inside the material.

Apart from this, the elements and composites used in accordance with the invention are distinguished by a particularly low specific weight. While known ceramic materials such as aluminum oxide have a relatively high specific weight (the specific weight of aluminum oxide is 3.8 g/cm$^3$), the composite materials used in accordance with the invention have a clearly lower specific weight of only 2.0 to 2.7 g/cm$^3$, in particular 2.3 to 2.4 g/cm$^3$. This means that the composite materials used in accordance with the invention in particular have a considerably lower specific weight than the metallic, ballistic steels used heretofore, which have a density of approximately 7.8 g/cm$^3$. Their specific weight, however, is even lower than that of the known aluminum oxide ceramics. This makes possible a pronounced weight saving potential when these materials are used in vehicle construction, aircraft construction and shipbuilding as well as in the protection of people.

The composite bodies used in accordance with the invention are distinguished by a very good breaking behavior, as may be observed in bombardment tests described below. The mechanical impulse energy of a projectile that acts on the material is absorbed by way of internal energy-absorbing effects in the composite body, inducing micro-cracks in the regions of the matrix between the fibers, which gradually absorb the energy of the bullets. In this connection, a flattening or mushrooming of the impacting projectiles results, in which case the bullet is braked and a conversion of the kinetic energy into energy for crack formation takes place.

In addition to carbon fibers and graphite fibers, technically equivalent fibers, such as aluminum oxide fibers, silicon nitride fibers and Si/B/C/N fibers, which are presented in German Patent DE 197 11 829 C1, for example, can also be used as the fibers. These can be contained in the composite material of the elements and composites in accordance with the invention in addition to or instead of the carbon fibers and graphite fibers. Preferably, fibers based on silicon, carbon, boron, nitrogen, aluminum or mixtures thereof are used.

Basically, when selecting the fibers, the criterion that these fibers are high-temperature fibers and can thus withstand temperatures of up to approximately 1600° C. should be fulfilled in order to ensure that they are not quickly damaged upon infiltration with molten materials. Conventional materials have no fiber protection (shell) so that, for example, unprotected carbon fibers are attacked upon infiltration with silicon and it is impossible to obtain a ductile material. The fibers used in accordance with the invention therefore advantageously have a protective coating. This preferably is formed of at least one carbon layer or graphite layer which results from the coking of synthetic resins, for example, and/or other carbon-donating substances and where possible subsequent graphitizing. A plurality of protective layers made of carbon or graphite is particularly preferred. The production of such a fiber provided with a protective shell or shells is known from German Published, Non-Prosecuted Patent Application DE 197 10 105 A1, for example.

In addition to short fibers, fibers having a greater length can also be used in the composite materials of the elements according to the invention. Basically, there is no restriction with respect to the fiber length. If short fibers (fiber lengths of up to approximately 4 mm) and fibers of greater length are placed in the composite material, the longer fibers above all contribute to the reinforcement of the material. The portion of these longer fibers is therefore denoted as reinforcing fibers in the following text and in the claims. In composite materials which contain only short fibers, these are the reinforcing fibers. The bundle thickness of the fibers (actual fiber bundle) is usually 1,000 to 920,000 filaments. The fibers of the elements in accordance with the invention preferably have a bundle thickness of 1 to 3,000 filaments.

An organic polymer such as polyacrylonitrile or cellulose, for example, can even be used as a starting material for the fibers. Flat shaped bodies such as woven fabrics or nonwoven fabrics can be produced from that material, as described in German Published, Non-Prosecuted Patent Application DE 195 17 911 A1. If cellulose is used, it is made unmeltable in a pre-process. It is also possible to use inorganic polymers, which are spun to form nonwoven fabrics. Polysilanes, polysilazanes, carbosilanes, which are made unmeltable, or nonwoven fabrics made of boron-containing silazanes, can be mentioned as materials to be used. It is favorable if woven fabrics are impregnated with substances of low viscosity, such as furfurylalcohol, polyphenylenes, polyimides or polyacrylates, in order to achieve a good wetting.

The composite materials used in the elements in accordance with the invention preferably also have phases of silicon and carbon in the matrix in addition to silicon carbide. It is particularly preferable if the matrix contains only phases of silicon carbide, silicon and carbon.

The composite material of the elements and composites in accordance with the invention contains at least 10% by weight of silicon carbide, advantageously 20% by weight and particularly preferably 30% by weight with respect to the total weight. The proportion of the fibers with respect to the total weight should be at least 5% by weight, preferably even 10%, and particularly preferably the proportion of the fibers is above 15% by weight. Furthermore, it is very advantageous if the composite material of the elements and composites in accordance with the invention has a ductile breaking behavior.

In order to also use the elements and composites in accordance with the invention as protection against the penetration of large caliber bullets, fiber-reinforced composite materials having the following properties are to be used.

A good protection is achieved if the composite material contains, with respect to its total weight, 40 to 85% by weight, preferably 55 to 80% by weight and particularly preferably 65 to 75% by weight silicon carbide, 5 to 55% by weight, preferably 10 to 40% by weight and particularly preferably 15 to 25% by weight carbon (including fibers) and 0 to 30% by weight, preferably 2 to 20% by weight and particularly preferably 5 to 15% by weight silicon. In this case, the proportion of the fibers with respect to the total weight is to be 5 to 40% by weight, preferably 8 to 30% by weight and particularly preferably 10 to 20% by weight. Furthermore, the average fiber length of the reinforcing fibers in this case is between 0.2 mm and 15 mm, preferably between 0.5 mm and 5 mm and particularly preferably between 1 mm and 2 mm. Apart from this, the fibers are coated with at least one layer of carbon.

An element made of a composite material of this type prevents the penetration of bullets having a kinetic energy of up to 942.9 J if the minimum thickness of the element parallel to the direction of impact of the bullet is 20 mm to 100 mm, preferably 24 mm to 60 mm and particularly preferably 28 mm to 40 mm. It prevents the penetration of bullets having a kinetic energy of up to 1510 J if the minimum thickness of the element parallel to the direction of impact of the bullet is 25 mm to 100 mm, preferably 28 mm to 70 mm and particularly preferably 36 mm to 50 mm. Apart from this, it prevents the penetration of bullets having a kinetic energy up to 1805 J if the minimum thickness of the element parallel to the direction of impact of the bullet is 32 mm to 100 mm, preferably 36 mm to 80 mm and particularly preferably 40 mm to 60 mm.

Furthermore, an element made of a composite material of this type prevents the penetration of cone point-head bullets having a soft core made of lead and a solid jacket made of steel with a mass of up to 10.2 q and a bullet velocity of up to 430 m/s, if the minimum thickness of the element parallel to the direction of impact of the bullet is 20 mm to 100 mm, preferably 24 mm to 60 mm and particularly preferably 28 mm to 40 mm. It prevents the penetration of flat-headed bullets having a soft core made of lead and a solid jacket made of copper with a mass of up to 15.6 g and a bullet velocity of up to 440 m/s if the minimum thickness of the element parallel to the direction of impact of the bullet is 25 mm to 100 mm, preferably 28 mm to 70 mm and particularly preferably 36 mm to 50 mm. Apart from this, it prevents the penetration of pointed bullets having a soft core made of lead with a steel penetrator and a solid jacket made of copper with a mass of up to 4.0 g and a bullet velocity of up to 950 m/s if the minimum thickness of the element parallel to the direction of impact of the bullet is 32 mm to 100 mm, preferably 36 mm to 80 mm and particularly preferably 40 mm to 60 mm.

A composite made up of an element made of such a composite material with a woven fabric of reinforcing fibers, which preferably has a thickness of up to 15 mm, in which the element and the woven fabric are connected to each other with an adhesive, prevents the penetration of bullets having a kinetic energy of up to 942.9 J, if the minimum thickness of the element parallel to the direction of impact of the bullet is 3.2 mm to 30 mm, preferably 4.5 mm to 25 mm and particularly preferably 6 mm to 20 mm. It prevents the penetration of bullets having a kinetic energy of up to 1510 J if the minimum thickness of the element parallel to the direction of impact of the bullet is 4 mm to 40 mm, preferably 5.5 mm to 30 mm and particularly preferably 7.5 mm to 25 mm. Apart from this, it prevents the penetration of bullets having a kinetic energy of up to 1805 J if the minimum thickness of the element parallel to the direction of impact of the bullet is 4.8 mm to 50 mm, preferably 6 mm to 40 mm and particularly preferably 8 mm to 30 mm. It prevents the penetration of bullets having a kinetic energy of up to 2105 J if the minimum thickness of the element parallel to the direction of impact of the bullet is 5.5 mm to 50 mm, preferably 7 mm to 40 mm and particularly preferably 10 mm to 30 mm. It prevents the penetration of bullets having a kinetic energy of up to 3272 J if the minimum thickness of the element parallel to the direction of impact of the bullet is 8 mm to 50 mm, preferably 10 mm to 40 mm and particularly preferably 12 mm to 30 mm.

Furthermore, a composite made up of an element made of such a composite material with a woven fabric of reinforcing fibers, which preferably has a thickness of up to 15 mm, in which the element and the woven fabric are connected to each other with an adhesive, prevents the penetration of cone point-head bullets having a soft core made of lead and a solid jacket made of steel with a mass of up to 10.2 g and a bullet velocity of up to 430 m/s, if the minimum thickness of the element parallel to the direction of impact of the bullet is 3.2 mm to 30 mm, preferably 4.5 mm to 25 mm and particularly preferably 6 mm to 20 mm. It prevents the penetration of flat-headed bullets having a soft core made of lead and a solid jacket made of copper with a mass of up to 15.6 g and a bullet velocity of up to 440 m/s if the minimum thickness of the element parallel to the direction of impact of the bullet is 4 mm to 40 mm, preferably 5.5 mm to 30 mm and particularly preferably 7.5 mm to 25 mm. Apart from this, it prevents the penetration of pointed bullets having a soft core made of lead with a steel penetrator and a solid jacket made of copper with a mass of up to 4.0 g and a bullet velocity of up to 950 m/s if the minimum thickness of the element parallel to the direction of impact of the bullet is 4.8 mm to 50 mm, preferably 6 mm to 40 mm and particularly preferably 8 mm to 30 mm. It prevents the penetration of cone point-head bullets having a soft core made of lead and a steel penetrator and a solid jacket made of copper with a mass of up to 7.9 g and a bullet velocity of up to 730 m/s if the minimum thickness of the element parallel to the direction of impact of the bullet is 5.5 mm to 50 mm, preferably 7 mm to 40 mm and particularly preferably 10 mm to 30 mm. It prevents the penetration of pointed bullets having a soft core made of lead and a solid jacket made of steel with a mass of up to 9.5 g and a bullet velocity of up to 830 m/s if the minimum thickness of the element parallel to the direction of impact of the bullet is 8 mm to 50 mm, preferably 10 mm to 40 mm and particularly preferably 12 mm to 30 mm.

A particularly good protection is achieved if the composite material contains, with respect to its total weight, 55 to 80% by weight and preferably 65 to 75% by weight of silicon carbide, 10 to 40% by weight and preferably 15 to 25% by weight of carbon (including fibers) and 2 to 20% by weight and preferably 5 to 15% by weight of silicon. In this case, the proportion of the fibers with respect to the total weight is to be 8 to 30% by weight and preferably 10 to 20% by weight. Furthermore, the average fiber length of the reinforcing fibers in this case is between 0.5 mm and 5 mm and preferably between 1 mm and 2 mm. Apart from this, the fibers are coated with at least one layer of graphitized carbon.

An element made of a composite material of this type prevents the penetration of bullets having a kinetic energy of up to 942.9 J, if the minimum thickness of the element parallel to the direction of impact of the bullet is 15 mm to 100 mm, preferably 19 mm to 60 mm and particularly preferably 23 mm to 40 mm. It prevents the penetration of bullets having a kinetic energy of up to 1510 J if the minimum thickness of the element parallel to the direction of impact of the bullet is 20 mm to 100 mm, preferably 25 mm to 70 mm and particularly preferably 30 mm to 50 mm. Apart from this, it prevents the penetration of bullets having a kinetic energy up to 1805 J if the minimum thickness of the element parallel to the direction of impact of the bullet is 25 mm to 100 mm, preferably 31 mm to 80 mm and particularly preferably 37 mm to 60 mm.

Furthermore, an element made of a composite material of this type prevents the penetration of cone point-head bullets having a soft core made of lead and a solid jacket made of steel with a mass of up to 10.2 g and a bullet velocity of up to 430 m/s, if the minimum thickness of the element parallel to the direction of impact of the bullet is 15 mm to 100 mm, preferably 19 mm to 60 mm and particularly preferably 23 mm to 40 mm. It prevents the penetration of flat-headed bullets having a soft core made of lead and a solid jacket made of copper with a mass of up to 15.6 g and a bullet velocity of up to 440 m/s if the minimum thickness of the element parallel to the direction of impact of the bullet is 20 mm to 100 mm, preferably 25 mm to 70 mm and particularly preferably 30 mm to 50 mm. Apart from this, it prevents the penetration of pointed bullets having a soft core made of lead with a steel penetrator and a solid jacket made of copper with a mass of up to 4.0 g and a bullet velocity of up to 950 m/s, if the minimum thickness of the element parallel to the direction of impact of the bullet is 25 mm to 100 mm, preferably 31 mm to 80 mm and particularly preferably 37 mm to 60 mm.

A composite made up of an element made of such a composite material with a woven fabric of reinforcing fibers, which preferably has a thickness of up to 15 mm, in which the element and the woven fabric are connected to each other with an adhesive, prevents the penetration of bullets having a kinetic energy of up to 942.9 J if the minimum thickness of the element parallel to the direction of impact of the bullet is 2.4 mm to 30 mm, preferably 3.5 mm to 25 mm and particularly preferably 5 mm to 20 mm. It prevents the penetration of bullets having a kinetic energy of up to 1510 J if the minimum thickness of the element parallel to the direction of impact of the bullet is 3 mm to 40 mm, preferably 4.5 mm to 30 mm and particularly preferably 6.5 mm to 25 mm. Apart from this, it prevents the penetration of bullets having a kinetic energy of up to 1805 J if the minimum thickness of the element parallel to the direction of impact of the bullet is 3.6 mm to 50 mm, preferably 5 mm to 40 mm and particularly preferably 7 mm to 30 mm. It prevents the penetration of bullets having a kinetic energy of up to 2105 J if the minimum thickness of the element parallel to the direction of impact of the bullet is 4 mm to 50 mm, preferably 6 mm to 40 mm and particularly preferably 8 mm to 30 mm. It prevents the penetration of bullets having a kinetic energy of up to 3272 J if the minimum thickness of the element parallel to the direction of impact of the bullet is 6 mm to 50 mm, preferably 7.5 mm to 40 mm and particularly preferably 9 mm to 30 mm.

Furthermore, a composite made up of an element made of such a composite material with a woven fabric of reinforcing fibers, which preferably has a thickness of up to 15 mm, in which the element and the woven fabric are connected to each other with an adhesive, prevents the penetration of cone point-head bullets having a soft core made of lead and a solid jacket made of steel with a mass of up to 10.2 g and a bullet velocity of up to 430 m/s, if the minimum thickness of the element parallel to the direction of impact of the bullet is 2.4 mm to 30 mm, preferably 3.5 mm to 25 mm and particularly preferably 5 mm to 20 mm. It prevents the penetration of flat-headed bullets having a soft core made of lead and a solid jacket made of copper with a mass of up to 15.6 g and a bullet velocity of up to 440 m/s, if the minimum thickness of the element parallel to the direction of impact of the bullet is 3 mm to 40 mm, preferably 4.5 mm to 30 mm and particularly preferably 6.5 mm to 25 mm. Apart from this, it prevents the penetration of pointed bullets having a soft core made of lead with a steel penetrator and a solid jacket made of copper with a mass of up to 4.0 g and a bullet velocity of up to 950 m/s, if the minimum thickness of the element parallel to the direction of impact of the bullet is 3.6 mm to 50 mm, preferably 5 mm to 40 mm and particularly preferably 7 mm to 30 mm. It prevents the penetration of cone point-head bullets having a soft core made of lead and a steel penetrator and a solid jacket made of copper with a mass of up to 7.9 g and a bullet velocity of up to 730 m/s, if the minimum thickness of the element parallel to the direction of impact of the bullet is 4 mm to 50 mm, preferably 6 mm to 40 mm and particularly preferably 8 mm to 30 mm. It prevents the penetration of pointed bullets having a soft core made of lead and a solid jacket made of steel with a mass of up to 9.5 g and a bullet velocity of up to 830 m/s, if the minimum thickness of the element parallel to the direction of impact of the bullet is 6 mm to 50 mm, preferably 7.5 mm to 40 mm and particularly preferably 9 mm to 30 mm.

A extremely good protection is achieved if the composite material contains, with respect to its total weight, 65 to 75% by weight silicon carbide, 15 to 25 by weight carbon (including fibers) and 5 to 15% by weight silicon. In this case, the proportion of the fibers with respect to the total weight is to be 10 to 20% by weight. Furthermore, the average fiber length of the reinforcing fibers in this case is between 1 mm and 2 mm. Apart from this, the fibers are coated with at least three layers of graphitized carbon.

An element made of a composite material of this type prevents the penetration of bullets having a kinetic energy of up to 942.9 J if the minimum thickness of the element parallel to the direction of impact of the bullet is 12 mm to 100 mm, preferably 15 mm to 60 mm and particularly preferably 18 mm to 40 mm. It prevents the penetration of bullets having a kinetic energy of up to 1510 J if the minimum thickness of the element parallel to the direction of impact of the bullet is 16 mm to 100 mm, preferably 20 mm to 70 mm and particularly preferably 24 mm to 50 mm. Apart from this, it prevents the penetration of bullets having a kinetic energy up to 1805 J if the minimum thickness of the element parallel to the direction of impact of the bullet is 20 mm to 100 mm, preferably 24 mm to 80 mm and particularly preferably 28 mm to 60 mm.

Furthermore, an element made of a composite material of this type prevents the penetration of cone point-head bullets having a soft core made of lead and a solid jacket made of steel with a mass of up to 10.2 g and a bullet velocity of up to 430 m/s, if the minimum thickness of the element parallel to the direction of impact of the bullet is 12 mm to 100 mm, preferably 15 mm to 60 mm and particularly preferably 18 mm to 40 mm. It prevents the penetration of flat-headed bullets having a soft core made of lead and a solid jacket made of copper with a mass of up to 15.6 g and a bullet velocity of up to 440 m/s, if the minimum thickness of the element parallel to the direction of impact of the bullet is 16 mm to 100 mm, preferably 20 mm to 70 mm and particularly preferably 24 mm to 50 mm. Apart from this, it prevents the penetration of pointed bullets having a soft core made of lead with a steel penetrator and a solid jacket made of copper with a mass of up to 4.0 g and a bullet velocity of up to 950 m/s, if the minimum thickness of the element parallel to the direction of impact of the bullet is 20 mm to 100 mm, preferably 24 mm to 80 mm and particularly preferably 28 mm to 60 mm.

A composite made up of an element made of such a composite material with a woven fabric of reinforcing fibers, which preferably has a thickness of up to 15 mm, in which the element and the woven fabric are connected to each other with an adhesive, prevents the penetration of bullets having a kinetic energy of up to 942.9 J if the minimum thickness of the element parallel to the direction of impact of the bullet is 2 mm to 30 mm, preferably 2.5 mm to 25 mm and particularly preferably 4 mm to 20 mm. It prevents the penetration of bullets having a kinetic energy of up to 1510 J if the minimum thickness of the element parallel to the direction of impact of the bullet is 2.5 mm to 40 mm, preferably 3 mm to 30 mm and particularly preferably 5.5 mm to 25 mm. Apart from this, it prevents the penetration of bullets having a kinetic energy of up to 1805 J if the minimum thickness of the element parallel to the direction of impact of the bullet is 3 mm to 50 mm, preferably 4 mm to 40 mm and particularly preferably 6 mm to 30 mm. It prevents the penetration of bullets having a kinetic energy of up to 2105 J if the minimum thickness of the element parallel to the direction of impact of the bullet is 3.5 mm to 50 mm, preferably 4.5 mm to 40 mm and particularly preferably 7 mm to 30 mm. It prevents the penetration of bullets having a kinetic energy of up to 3272 J if the minimum thickness of the element parallel to the direction of impact of the bullet is 5 mm to 50 mm, preferably 6 mm to 40 mm and particularly preferably 8 mm to 30 mm.

Furthermore, a composite made up of an element made of such a composite material with a woven fabric of reinforcing fibers, which preferably has a thickness of up to 15 mm, in which the element and the woven fabric are connected to each other with an adhesive, prevents the penetration of cone point-head bullets having a soft core made of lead and a solid jacket made of steel with a mass of up to 10.2 g and a bullet velocity of up to 430 m/s, if the minimum thickness of the element parallel to the direction of impact of the bullet is 2 mm to 30 mm, preferably 2.5 mm to 25 mm and particularly preferably 4 mm to 20 mm. It prevents the penetration of flat-headed bullets having a soft core made of lead and a solid jacket made of copper with a mass of up to 15.6 g and a bullet velocity of up to 440 m/s, if the minimum thickness of the element parallel to the direction of impact of the bullet is 2.5 mm to 40 mm, preferably 3 mm to 30 mm and particularly preferably 5.5 mm to 25 mm. Apart from this, it prevents the penetration of pointed bullets having a soft core made of lead with a steel penetrator and a solid jacket made of copper with a mass of up to 4.0 g and a bullet velocity of up to 950 m/s, if the minimum thickness of the element parallel to the direction of impact of the bullet is 3 mm to 50 mm, preferably 4 mm to 40 mm and particularly preferably 6 mm to 30 mm. It prevents the penetration of cone point-head bullets having a soft core made of lead and a steel penetrator and a solid jacket made of copper with a mass of up to 7.9 g and a bullet velocity of up to 730 m/s, if the minimum thickness of the element parallel to the direction of impact of the bullet is 3.5 mm to 50 mm, preferably 4.5 mm to 40 mm and particularly preferably 7 mm to 30 mm. It prevents the penetration of pointed bullets having a soft core made of lead and a solid jacket made of steel with a mass of up to 9.5 g and a bullet velocity of up to 830 m/s, if the minimum thickness of the element parallel to the direction of impact of the bullet is 5 mm to 50 mm, preferably 6 mm to 40 mm and particularly preferably 8 mm to 30 mm.

In addition to the fibers, various fillers can also be placed in the matrix. In particular, silicides, carbides, borides, metals and carbon, for example in the form of carbon black, graphite, coke or mixtures thereof, are suitable as fillers. Silicon carbides, $B_4C$, carbon black, graphite or zirconium borides are of particular interest in this case. The use of carbon black and/or graphite is particularly preferred because a good conversion into SiC is rendered possible by these substances. The use of $B_4C$ is common in applications at the present time if a high level of hardness of the composite body is to be achieved. Zirconium borides are used because of their resistance to high temperatures. Therefore, advantages are to be expected when they are used for the composite bodies used in accordance with the invention, in particular in the case of bombardment with signal ammunition. If, however, composite bodies having a particularly low specific weight are to be used, it is preferable to use fillers other than zirconium boride, which has a high density.

The amount of the fillers to be used if appropriate can be determined as a function of the properties of the composite body that are to be achieved. When reacting fillers such as carbon black or graphite are used, the amount is preferably up to 40% by weight, with respect to the mixture at the beginning of the production. At higher amounts, a deformation of the body or even cracking can occur. More preferably, the amount is up to 30% by weight. If non-reacting fillers, for example SiC, are used, even higher concentrations are usable. The proportion of such fillers depends fundamentally on the brittleness and the hardness which are to be adjusted.

A significant advantage of the use of the fiber-reinforced composite material with a ceramic matrix lies in the fact that the elements can be produced directly in the shape of the desired structural component, so that shaping steps after the production of the elements can be avoided and thus a further reduction in costs in the production of protective plates or armor plates, for example, is obtained. In view of the high breaking strength of the elements, it is not absolutely necessary to provide the elements in accordance with the invention with a rear-side reinforcement. In that case the reinforcing material, such as fiber fabric (for example aramide fibers) or metal plates, is glued on to the rear side of the composite material in order to obtain a bombardment-resistant armor plate. Instead, the composite body itself can already form this armor plate. However, the thickness of an element in accordance with the invention that is made of a composite material is greater than that required for the element if, as a result of the rear-side reinforcement, a composite in accordance with the invention having the same effect is made available.

The production of the composite material which is fiber-reinforced at least partly with carbon fibers and/or graphite fibers and has a ceramic matrix which contains silicon carbide can, for example, take place according to the processes known from German Patent DE 197 11 829 C1 or German Published, Non-Prosecuted Patent Application DE 197 10 105 A1. Reference to those two printed publications is made explicitly with respect to the production process.

Basically, all known processes can be used in order to produce fiber-reinforced C/SiC ceramics. In the processes cited above, the following production steps are carried out in order to produce composite materials into which individual fibers (or fiber bundles) are incorporated.

As described in German Patent DE 197 11 829 C1 and German Published, Non-Prosecuted Patent Application DE 197 10 105 A1, for example, the incorporated fibers are pre-treated or produced and mixed, by way of a mixer, with a carbon-donating resin and are molded into the initial shape by way of a pressing mold and hardened at temperatures of up to approximately 150° C. The molded bodies (CFC precursors) which result in this way are pyrolyzed at temperatures of up to approximately 1,000° C. and possibly subsequently graphitized at temperatures of up to approximately 2,000° C.

The CFC preliminary body which is obtained in this way is subsequently impregnated with liquid silicon at temperatures of up to approximately 1800° C. in a vacuum. In this connection, a large portion of the matrix carbon reacts in an exothermal reaction with the incorporated silicon to form silicon carbide. Due to a special pre-treatment of the fibers, the carbon fibers are retained during this reaction and can thus contribute to the ductilization of the ceramics.

Known 2D and 3D CFC woven-fabric structures with large volumetric contents of the fibers, which are also suitable, can be produced, inter alia, directly from polyacrylonitrile planar fiber structures by way of the direct oxidation process and by subsequent pyrolysis. In this connection, the following process steps are carried out in particular.

The carbon-fiber reinforcing structure is made into a shape which corresponds to the desired final shape. The fiber body is impregnated under pressure with a resin matrix in a vacuum at 1300° C., and after hardening and removal from the mold, finished according to need.

CFK preliminary bodies which result in this way are then pyrolyzed at temperatures of up to 1000° C. Then, an increase of the density of this CFC material can take place with a pitch-based or resin-based carbon-containing polymer in one or more steps, with a further pyrolysis step following each density-increasing step. In this way, a CFC material which is suitable for the subsequent infiltration is obtained. In that material the carbon fibers are sufficiently protected against an attack of the liquid silicon in particular. Subsequently, a graphitization of the CFC composite material at temperatures of up to approximately 2000° C. can take place.

The silication is carried out at temperatures of up to approximately 1800° C. in a vacuum.

For example, the shapes of vehicle doors or certain aircraft components can be formed directly by way of the concrete processes described above.

In addition to silicon, other materials also come into consideration as an infiltration material and those materials are added to the silicon. Basically, the materials used for infiltration must be able to melt in the temperature range up to 1800° C. Aluminum, boron, magnesium, nitrogen, carbon and compounds or mixtures thereof as well as silicides come into consideration as further infiltration materials. Even silicides exclusively can be infiltrated in order to form a matrix containing silicon carbide.

Silicon is particularly preferably used as an infiltration material during the production of the composite bodies. During the addition of other substances, suicides, such as, for example, molybdenum suicides, iron suicides, chromium suicides, tantalum suicides or mixtures, are preferably added to silicon. Materials of this type can alter the melting point of the infiltration material.

It is likewise also possible to use silicon-based polymers as an infiltration material. Examples of such polymers are, for example, boron-containing polysilazanes.

Other features which are considered as characteristic for the invention are set forth in the appended claims.

Although the invention is described herein as embodied in protection products and armored products made of a fiber-reinforced composite material with a ceramic matrix, it is nevertheless not intended to be limited to the details given, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying examples.

DESCRIPTION OF THE PREFERRED EMBODIMENTS

Examples 1 and 2

Production of Elements Made of a Fiber-reinforced Composite Material with a Ceramic Matrix First of all, a prepreg is produced from 3K carbon fiber bundles (3,000 individual filaments). The carbon fibers were produced on the basis of PAN fibers. For this purpose, the fiber bundles were interlaced to form a Koeper-fabric, the woven fabric was subsequently soaked in phenolic resin (resol type) and it was provided with an anti-adhesive paper on both sides. After this, the resin-soaked woven fabric was heated to 130° C. in order to achieve the adhesiveness of the prepreg.

Subsequently, the prepreg plates were laid on top of each other and pressed to form a pressed body. This was then baked at 900° C., with a baking curve having a rise of 5° C. per minute in a range between 400° C. and 600° C. Then, three times, one after another, the CFC body that was obtained in this way was first impregnated with a coal tar pitch having a softening point of 60° C. and then baked, again at 900° C., in order to compact it further.

The CFC body which was obtained in this way was then first broken up into small pieces in a jaw breaker (manufacturer: Alpine Hosokawa) and subsequently cut into fiber bundles in a cutting mill (manufacturer: Alpine Hosokawa). The fiber bundles were then sorted in a tumbler sieving unit (manufacturer: Allgaier) into individual fiber fractions, with sieve inserts (sieving area 1.15 m$^2$) having a clear mesh aperture of 0.5 mm, 1 mm, 2 mm, 3 mm, 4 mm and 6 mm in accordance with ISO 9044. As a result of this sieving process, different fiber fractions were obtained, as a result of which there were, among others, a fraction A with fibers of a length of 12.45 mm to 17.55 mm and a width of 660 $\mu$m to 2.26 mm, a fraction B with fibers of a length of 8.5 mm to 13.5 mm and a width of 690 $\mu$m to 2.21 mm, a fraction C with fibers of a length of 5.5 mm to 10.5 mm and a width of 760 $\mu$m to 2.16 mm, a fraction D with fibers of a length of 0.2 mm to 3 mm and a width of 200 $\mu$m to 1 mm, a fraction E with fibers of a length of 0.1 mm to 3 mm and a width of 50 to 500 $\mu$m and a fraction F with fibers of a length up to 0.3 mm and a width of 8 to 200 $\mu$m.

Subsequently, for samples of Example 1, a mixture 1 made up of 70% of the total weight of fibers, in accordance with a composition: 35% fraction D, 35% fraction E and 30% fraction F, and 30% of the total weight of phenolic resin (resol type) as a binding agent, and for samples of Example 2, a mixture 2 made up of 70% of the total weight of fibers, in accordance with a composition: 12% fraction A, 18% fraction B, 40% fraction C and 30% fraction D, and 21% of the total weight of phenolic resin (resol type) and 9% of the total weight of coal tar pitch (softening point: 230° C.) as a binding agent, were produced in a Z-arm kneader (manufacturer: Werner & Pfleiderer) by mixing for 15 minutes at a rotational speed of 30 l/min. Subsequently, in each case 1200 g of the mixture 1 was pressed in a stamping press in a square pressing mold having a side length of 325 mm at a specific pressure of 12 Kp/cm$^2$ and a temperature of 130° C. This temperature was maintained for 3 hours at a constant mold pressure. After cooling to 30° C., the hardened plate was removed from the pressing mold. As a result of this manner of proceeding, a CFK plate with a height (thickness) of 10 mm and a density of 1.2 g/cm$^3$ was obtained.

In an analogous manner, plates with a thickness of 38 mm and a density of 1.18 g/cm$^3$ were obtained in each case from 5100 g of the mixture 2.

After this, the carbonization of the samples took place at 900° C. under inert gas (heating rate of 2 K/min). The cooling of the plates to room temperature took place in an uncontrolled manner at up to 10 K/min. After carbonization, these plates had densities of 1.05 g/cm$^3$ (Example 1) and 1.03 g/cm$^3$ (Example 2).

Subsequently, the infiltration of the samples at 1700° C. with liquid silicon took place in a vacuum in a high-temperature furnace with a silicon supply (particle size up to 5 mm) of one and a half times the sample weight, as a result of which the SiC structure of the matrix of the samples was generated. In this connection, the silication took place first of all with a temperature rise of 10 K/min to 1400° C. and then 5 K/min to 1800° C. The temperature was then held for 45 minutes, then a temperature drop with 5 K/min to 1400° C. and subsequently an uncontrolled cooling, took place. The C/SiC composite materials that were obtained in this way had densities of 2.4 g/cm$^3$ and 2.35 g/cm$^3$. The plates made of the C/SiC composite material of Example 1 that were produced in this way had a fiber proportion with respect to the total weight of 15% and a composition with respect to the total weight of 68% silicon carbide, 22% carbon and 10% silicon. The average fiber length was 1.5 mm. The plates made of the C/SiC composite material of Example 2 had a fiber proportion with respect to the total weight of 17% and a composition with respect to the total weight of 58% silicon carbide, 31% carbon and 11% silicon. The average fiber length of the reinforcing fibers was 10 mm.

Example 3

Production of an Element Made of a Fiber-reinforced Composite Material with a Ceramic Matrix Having a Rear-side Reinforcement.

The 10 mm thick plates produced in accordance with Example 1 were additionally provided with a conventional rear-side reinforcement system (backing) in order to use them for protection against bombardment. In order to do so, the rear side of the ceramic plate was first blasted with silica sand and after that 10 layers of aramide fiber fabric T 750 (Akzo Nobel, Germany) were glued to the rear side of the C/SiC plate with a PUR glue SIKAFLEX 225 FC (manufacturer: Sika Chemie GmbH, Germany) and an adhesive primer.

Results of bombardment tests:

Bombardment tests were carried out with the elements made of fiber-reinforced composite materials having a ceramic matrix with a rear-side reinforcement in accordance with Example 3 and without a rear-side reinforcement in accordance with Example 2. The testing process took place in a penetration test according to the Euro standard, DIN EN 1523. The test requirements were the impeding of penetration in resistance classes according to Table 1 of the Euro standard DIN EN 1522. In order to set up the test, the plates were clamped on a stand, with the test sample being fastened at an angle of 90° to the shooting direction. The firing distance was 5 or 10 m. The striking distance was 120 mm±10 mm.

First, bombardment tests were carried out on plates having the dimensions 325 mm×278 mm×38 mm which were produced from plates in accordance with Example 2. It was found that the plates resisted the following bombardment tests, with at least three shots being fired at a plate in each case.

Test 1 (bombardment class FB 3):

A weapon type "test barrel" with a 357 magnum caliber was used as the weapon, and the bullet had a solid jacket made of steel, a cone point-head and a soft core made of lead. The bullet weight was 10.2 g. The test distance was 5 m. The bullet velocity was 430 m/s and the bullet energy was 942.9 J.

Test 2 (bombardment class FB 4):

A weapon type "test barrel" with a 44 Rem. magnum caliber was used as the weapon, and the bullet had a solid jacket made of copper, a flat-head and a soft core made of lead. The bullet weight was 15.6 g. The test distance was 5 m. The bullet velocity was 440 m/s and the bullet energy was 1510 J.

It became clear that the plates in the case of this test are also resistant to a multiple bombardment if the bullets hit with a spacing of 50 mm, which corresponds to the effect of automatic weapons (multi-hit capability).

Test 3 (bombardment class FB 5):

A weapon type "test barrel" with a 5.56 mm×45 mm caliber was used as the weapon, and the bullet had a solid jacket made of copper, a pointed head and a soft core made of lead with a steel penetrator (type SS 109). The bullet weight was 4.0 g. The test distance was 10 m. The bullet velocity was 950 m/s and the bullet energy was 1805 J.

In all of these bombardment tests on the large-sized protective elements made of the C/SiC composite material, no crack preventing a further use as protection appeared in the elements.

Apart from this, elements having the dimensions 300 mm×300 mm in accordance with Example 3, which had a C/SiC composite-material plate of only 10 mm thickness and a rear-side reinforcement, were exposed to the bombardment tests.

Test 4 (bombardment class FB 3):

A weapon type "test barrel" with a 357 magnum caliber was used as the weapon, and the bullet had a solid jacket made of steel, a cone point-head and a soft core made of lead. The bullet weight was 10.2 g. The test distance was 5 m. The bullet velocity was 430 m/s and the bullet energy was 942.9 J.

Test 5 (bombardment class FB 4):

A weapon type "test barrel" with a 44 Rem. magnum caliber was used as the weapon, and the bullet had a solid jacket made of copper, a flat-head and a soft core made of lead. The bullet weight was 15.6 g. The test distance was 5 m. The bullet velocity was 440 m/s and the bullet energy was 1510 J.

It became clear that the plates in the case of this test are also resistant to a multiple bombardment if the bullets hit with a spacing of 50 mm, which corresponds to the effect of automatic weapons (multi-hit capability).

Test 6 (bombardment class FB 4+):

A Kalashnikov AK 47 with a 7.62 mm×39 mm caliber was used as the weapon, and the bullet had a solid jacket made of copper, a cone point-head and a soft core made of lead with a steel penetrator. The bullet weight was 7.9 g. The test distance was 10 m. The bullet velocity was 730 m/s and the bullet energy was 2105 J.

Test 7 (bombardment class FB 5):

A weapon type "test barrel" with a 5.56 mm×45 mm caliber was used as the weapon, and the bullet had a solid jacket made of copper, a pointed head and a soft core made of lead with a steel penetrator (type SS 109). The bullet weight was 4.0 g. The test distance was 10 m. The bullet velocity was 950 m/s and the bullet energy was 1805 J.

Test 8 (bombardment class FB 6):

A weapon type "test barrel" with a 7.62 mm×51 mm caliber was used as the weapon, and the bullet had a solid jacket made of steel, a pointed head and a soft core made of lead. The bullet weight was 9.5 g. The test distance was 10 m. The bullet velocity was 830 m/s and the bullet energy was 3272 J.

No crack preventing a further use as protection appeared in the elements even in these bombardment tests on the large-sized protective elements made of the c/sic composite material with rear-side reinforcement.

The prevailing temperature in the bombardment tests was 20 to 22° C.

On the basis of the above results, it is evident that elements made of C/SiC composite materials with and without rear reinforcement can be bombarded without shattering. In this connection, the plates display a resistance even in the case of high demands. In particular, the thickness of the C/SiC plates in the case of a rear-side reinforcement according to conventional technology can be chosen to be so small that an economical use is also provided and despite this a high level of safety is ensured.

We claim:

1. A protection element for at least partial absorption of at least one impact-like load focussed at a point, comprising:
   body having at least one dimension at least equal to 3 cm, in a direction perpendicular to a load to be absorbed;
   said body including a fiber-reinforced composite material,
   said composite material having reinforcing fibers and a ceramic matrix with at least 10% by weight of silicon carbide,
   said ceramic matrix having phases selected from the group consisting of phases of carbon, and phases of carbon and silicon; and
   at least 5% by weight of said reinforcing fibers selected from the group consisting of carbon fibers; graphite fibers; and
   carbon fibers and graphite fibers.

2. The protection element according to claim 1, wherein said at least one dimension is at least equal to 30 cm.

3. The protection element according to claim 1, wherein said ceramic matrix of said composite material consists of phases selected from the group consisting of phases of carbon, phases of carbon and silicon, phases of silicon carbide and carbon, and phases of silicon and silicon carbide and carbon.

4. The protection element according to claim 1, wherein said fibers of said composite material are selected from the group consisting of carbon fibers, graphite fibers, and carbon fibers and graphite fibers.

5. The protection element according to claim 1, wherein said fibers include fibers selected from the group consisting of aluminum oxide fibers; silicon nitride fibers; and Si/B/C/N fibers.

6. A protection element for at least partial absorption of at least one impact-like load focussed at a point, comprising:
   a body having at least one dimension at least equal to 3 cm, in a direction perpendicular to a load to be absorbed;
   said body including a composite material having reinforcing fibers, said composite material having a ceramic matrix with at least 10% by weight of silicon carbide and phases selected from the group consisting of phases of carbon, and phases of carbon and silicon; and
   said reinforcing fibers selected from the group consisting of aluminum oxide fibers; silicon nitride fibers; and Si/B/C/N fibers.

7. The protection element according to claim 1, wherein said composite material has a ductile breaking behavior.

8. The protection element according to claim 4, herein said composite material has a ductile breaking behavior.

9. The protection element according to claim 4, wherein said fibers of said composite material have a coating.

10. The protection element according to claim 9, wherein said coating of said fibers is selected from the group consisting of at least one layer of carbon; at least one layer of graphite; and layers of carbon and graphite.

11. The protection element according to claim 10, wherein each of said fibers is surrounded by and connected to a shell of graphite converted partially into silicon carbide, said graphite resulting from coking and subsequent graphitizing of at least one material selected from the group consisting of synthetic resins; other carbon-donating substances; and synthetic resins and other carbon-donating substances.

12. A protection element for at least partial absorption of a loading of grenade splinters, comprising:
   a body having at least one dimension at least equal to 3 cm, in a direction perpendicular to a load to be absorbed;
   said body including a fiber-reinforced composite material having reinforcing fibers, said composite material having a ceramic matrix with at least 10% by weight of silicon carbide and phases selected from the group consisting of phases of carbon, and phases of carbon and silicon; and
   at least 5% by weight of said reinforcing fibers selected from the group consisting of carbon fibers; graphite fibers; and
   carbon fibers and graphite fibers.

13. A protection element for at least partial absorption of a loading by bombardment, comprising:
   a body having at least one dimension at least equal to 3 cm, in a direction perpendicular to a load to be absorbed;
   said body including a fiber-reinforced composite material having reinforcing fibers, said composite material having a ceramic matrix with at least 10% by weight of silicon carbide and phases selected from the group consisting of phases of carbon, and phases of carbon and silicon; and at least 5% by weight of said reinforcing fibers selected from the group consisting of carbon fibers; graphite fibers; and carbon fibers and graphite fibers.

14. The protection element according to claim 13, wherein said fibers of said composite material are selected from the group consisting of carbon fibers; graphite fibers; and carbon fibers and graphite fibers and said fibers of said composite material have a coating selected from the group consisting of at least one layer of carbon; at least one layer of graphite; and layers of carbon and graphite.

15. The protection element according to claim 1, wherein said body has a shaped structure.

16. The protection element according to claim 10, wherein said body has a shaped structure.

17. The protection element of claim 1, wherein the composite material contains at least 5 percent of carbon other than in the from of fibers, with respect to its total weight.

* * * * *